(12) United States Patent
Mahurin

(10) Patent No.: US 10,459,723 B2
(45) Date of Patent: Oct. 29, 2019

(54) SIMD INSTRUCTIONS FOR MULTI-STAGE CUBE NETWORKS

(71) Applicant: QUALCOMM Incorporated, San Diego, CA (US)

(72) Inventor: Eric Wayne Mahurin, Austin, TX (US)

(73) Assignee: QUALCOMM Incorporated, San Diego, CA (US)

(*) Notice: Subject to any disclaimer, the term of this patent is extended or adjusted under 35 U.S.C. 154(b) by 292 days.

(21) Appl. No.: 14/804,190

(22) Filed: Jul. 20, 2015

(65) Prior Publication Data

US 2017/0024208 A1  Jan. 26, 2017

(51) Int. Cl.
G06F 9/30 (2018.01)
G06F 15/80 (2006.01)

(52) U.S. Cl.
CPC ...... *G06F 9/30032* (2013.01); *G06F 9/30036* (2013.01); *G06F 9/30072* (2013.01); *G06F 15/8053* (2013.01)

(58) Field of Classification Search
CPC ............. G06F 9/30032; G06F 9/30036; G06F 9/30072; G06F 15/8053; G06F 15/8007; G06F 9/3887
See application file for complete search history.

(56) References Cited

U.S. PATENT DOCUMENTS

| | | | |
|---|---|---|---|
| 5,299,317 A * | 3/1994 | Chen ...................... | H04Q 3/685 710/317 |
| 7,793,084 B1 * | 9/2010 | Mimar ................ | G06F 9/30021 712/236 |
| 7,814,303 B2 | 10/2010 | Muff et al. | |

(Continued)

FOREIGN PATENT DOCUMENTS

EP  2674855 A1  12/2013

OTHER PUBLICATIONS

Xiao Yang, Manish Vachharajani, and Ruby Lee, "Fast Subword Permutation Instructions Based on Butterfly Networks", Princeton University, pp. 1-7 (Year: 2000).*

(Continued)

*Primary Examiner* — Aimee Li
*Assistant Examiner* — Andrew J Cromer
(74) *Attorney, Agent, or Firm* — Muncy, Geissler, Olds & Lowe, P.C./Qualcomm

(57) ABSTRACT

Systems and methods relate to performing data movement operations using single instruction multiple data (SIMD) instructions. A first SIMD instruction comprises a first input data vector having a number N of two or more data elements in corresponding N SIMD lanes and a control vector having N control elements in the corresponding N SIMD lanes. A first multi-stage cube network is controllable by the first SIMD instruction, and includes movement elements, with one movement element per SIMD lane, per stage. A movement element selects between one of two data elements based on a corresponding control element and moves the data elements across the stages of the first multi-stage cube network by a zero distance or power-of-two distance between adjacent stages to generate a first output data vector. A second multi-stage cube network can be used in conjunction to generate all possible data movement operations of the input data vector.

26 Claims, 6 Drawing Sheets

(56) References Cited

U.S. PATENT DOCUMENTS

| | | | |
|---|---|---|---|
| 8,200,940 B1 | 6/2012 | Lindholm | |
| 8,688,957 B2 | 4/2014 | Smelyanskiy et al. | |
| 2002/0031220 A1* | 3/2002 | Lee | G06F 9/30032 380/37 |
| 2003/0028696 A1 | 2/2003 | Catherwood et al. | |
| 2009/0187746 A1* | 7/2009 | Symes | G06F 9/30032 712/222 |
| 2009/0254736 A1 | 10/2009 | Symes et al. | |
| 2009/0313442 A1* | 12/2009 | Moyer | G06F 9/30032 711/154 |
| 2010/0106940 A1* | 4/2010 | Muff | G06F 9/30032 712/7 |
| 2010/0274988 A1* | 10/2010 | Mimar | G06F 9/30036 712/5 |
| 2010/0274990 A1* | 10/2010 | Wilder | G06F 9/3001 712/22 |
| 2011/0072065 A1* | 3/2011 | Mimar | G06F 17/147 708/402 |
| 2012/0131309 A1 | 5/2012 | Johnson et al. | |
| 2013/0212355 A1* | 8/2013 | Mimar | G06F 9/30018 712/5 |
| 2013/0227249 A1* | 8/2013 | Barowski | G06F 15/803 712/22 |
| 2013/0275729 A1 | 10/2013 | Abraham et al. | |
| 2013/0290943 A1 | 10/2013 | Uliel et al. | |
| 2014/0281373 A1* | 9/2014 | Nilsson | G06F 15/8053 712/7 |
| 2015/0006858 A1* | 1/2015 | Toll | G06F 9/30018 712/208 |
| 2015/0205609 A1* | 7/2015 | Godard | G06F 9/3001 712/222 |

OTHER PUBLICATIONS

International Search Report and Written Opinion—PCT/US2016/038345—ISA/EPO—dated Sep. 23, 2016.

\* cited by examiner

US 10,459,723 B2

SIMD INSTRUCTIONS FOR MULTI-STAGE CUBE NETWORKS

FIELD OF DISCLOSURE

Disclosed aspects pertain to interconnection networks for movement of vector data. More specifically, exemplary aspects relate to single instruction multiple data (SIMD) instructions and interconnection networks, such as multi-stage cube networks that are responsive to the SIMD instructions, for movement of data elements of a data vector across SIMD lanes.

BACKGROUND

Some processing systems may support vector processing or parallel processing of operations on two or more data elements of a data vector. Some such operations may involve movement of data elements of a data vector. For example, a permutation operation may involve rearranging positions of one or more data elements within the data vector. A broadcasting operation may involve copying a selected data element and replacing every other data element with the selected data element. Numerous other such data movement operations may be used in processing applications such as multimedia processing, digital signal processing, etc.

Conventional processing systems handle data movement operations by implementing interconnection networks such as crossbar. A crossbar may be implemented using multiplexors. For example, in order to achieve all permutations and data movement operations for a vector comprising N data elements, an N×N crossbar may be implemented using N N-input multiplexors. Each N-input multiplexor may select as its output, any one of the N data elements. While a crossbar implementation achieves the desired functionality, it incurs significant hardware costs for implementing the N N-input multiplexors. Moreover, the crossbar implementations are not easily scalable as the size of (e.g. the number of data elements in) data vectors to be operated on increases.

Accordingly, there is a need in the art for hardware-efficient and scalable solutions for implementing data movement operations for data elements of data vectors.

SUMMARY

Exemplary aspects relate to systems and methods relate for performing data movement operations using single instruction multiple data (SIMD) instructions. A first SIMD instruction, for example, comprises a first input data vector having a number N of two or more data elements in corresponding N SIMD lanes and a control vector having N control elements in the corresponding N SIMD lanes. A first multi-stage cube network is controllable by the first SIMD instruction, and includes movement elements, with one movement element per SIMD lane, per stage. A movement element selects between one of two data elements based on a corresponding control element and moves the data elements across the stages of the first multi-stage cube network by a zero distance or power-of-two distance between adjacent stages to generate a first output data vector. A second multi-stage cube network can be used in conjunction with the first multi-stage cube network to generate all possible data movement operations of the input data vector.

For example, an exemplary aspect relates to a method of performing a data movement operation, the method comprising: receiving a first single instruction multiple data (SIMD) instruction comprising a first input data vector having a number N of two or more data elements in corresponding N SIMD lanes and a control vector having N control elements in the corresponding N SIMD lanes, controlling at least one movement element of a first multi-stage cube network using at least one control element to select between one of two data elements of the first input data vector, wherein the first multi-stage cube network comprises one or more stages of movement with one movement element per SIMD lane, per stage, and moving the data elements of the first input data vector across the one or more stages based on controlling the movement elements to generate a first output data vector.

Another exemplary aspect relates to a processor comprising: a first multi-stage cube network responsive to a first single instruction multiple data (SIMD) instruction, the first SIMD instruction comprising a first input data vector having a number N of two or more data elements corresponding to N SIMD lanes and a control vector having N control elements corresponding to the N SIMD lanes. The first multi-stage cube network is configured to perform data movement of the two or more data elements in one or more stages of movement. The first multi-stage cube network comprises two or more movement elements with one movement element per SIMD lane, per stage. The movement elements are configured to select between one of two data elements of the first input data vector based on a control element; and move the data elements of the first input vector across the one or more stages, to generate a first output data vector.

Yet another exemplary aspect relates to a processor comprising: a first means for moving data elements, the first means responsive to a first single instruction multiple data (SIMD) instruction, the first SIMD instruction comprising a first input data vector having a number N of two or more data elements corresponding to N SIMD lanes and a control vector having N control elements corresponding to the N SIMD lanes. The first means comprises means for moving the two or more data elements in one or more stages of movement based on corresponding control elements for each SIMD lane, per stage, to generate an output data vector.

Another exemplary aspect relates to a non-transitory computer-readable storage medium comprising instructions executable by a processor, which when executed by the processor cause the processor to perform data movement operations, the non-transitory computer-readable storage medium comprising: a first single instruction multiple data (SIMD) instruction comprising a first input data vector having a number N of two or more data elements in corresponding N SIMD lanes and a control vector having N control elements in the corresponding N SIMD lanes. A first multi-stage cube network comprising one or more stages of movement and one movement element per SIMD lane per stage is responsive to the first SIMD instruction, wherein a movement element is controllable to select between one of two data elements based on a corresponding control element.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
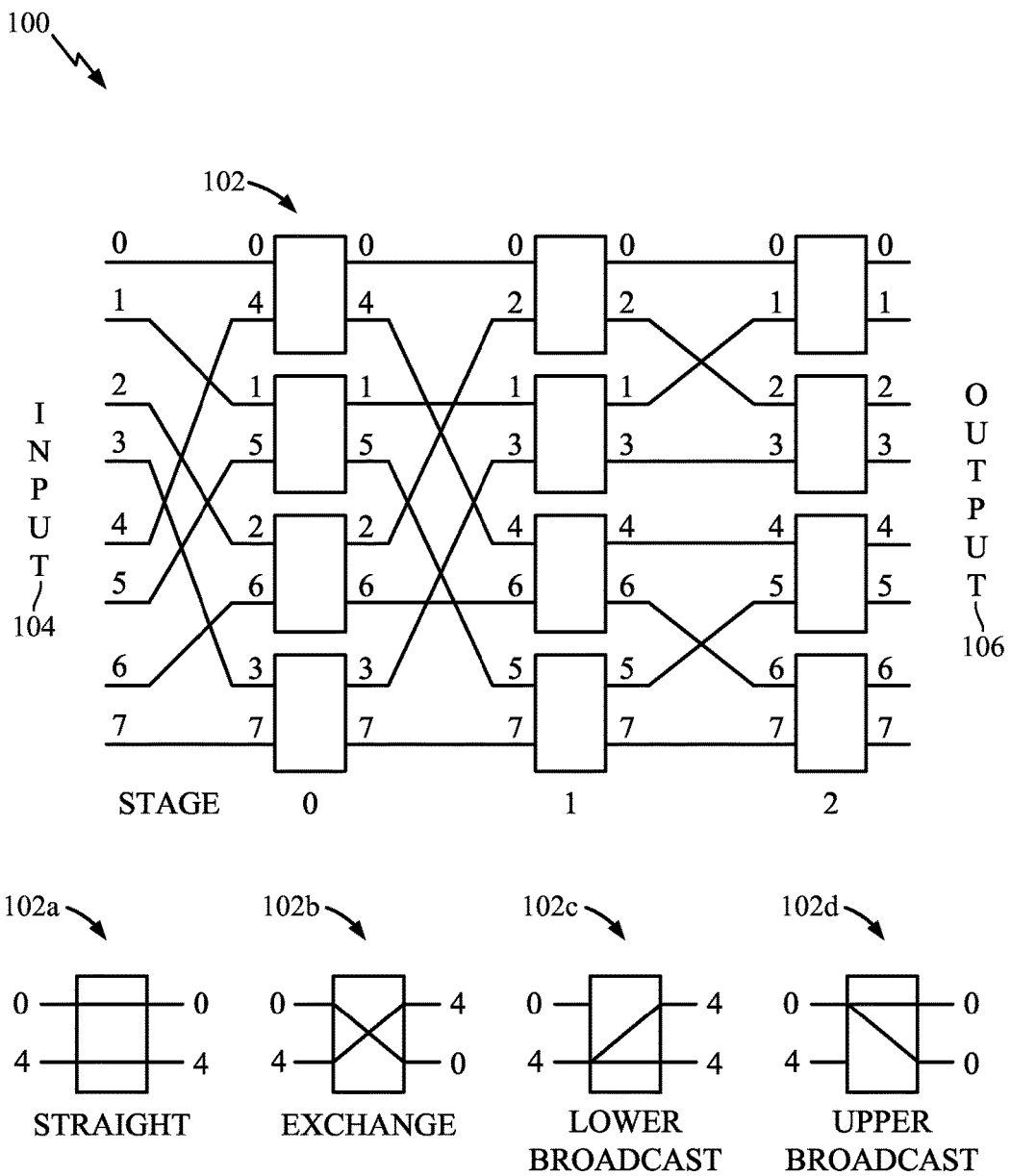
FIG. 1 illustrates a conventional multi-stage cube network comprising interchange boxes.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary aspects relate to specialized instructions and implementation of data movement operations in processing systems, using multi-stage interconnection networks. More specifically, aspects of this disclosure pertain to single instruction multiple data (SIMD) instructions for controlling data movement of two or more data elements of a data vector, and a generalized cube network responsive to the exemplary SIMD instructions. The generalized cube networks may include multiple stages, and thus, may also be referred to as a "multi-stage cube network."

In general, SIMD instructions may be used in processing systems for exploiting data parallelism. Data parallelism exists when a same or common task needs to be performed on two or more data elements of a data vector. Rather than use multiple instructions, the common task may be performed on the two or more of the data elements in parallel by using a single instruction known as a SIMD instructions. SIMD instructions may be of a format which specifies a common operation and a set of two or more data elements on which the common operation is to be performed.

A generalized cube network or a multi-stage cube network is a multistage interconnection network, generally implemented with switches, known as "interchange boxes" in each stage, which are configured to allow data movement in predetermined patterns. Compared to the cost of a N×N crossbar, the multi-stage cube networks incur a significantly lower cost, in the order of $N*\log_2(N)$, for implementing all possible data movement operations for N data elements. In exemplary aspects, a pair of complementary SIMD instructions may be used for controlling mirrored stages of a multi-stage cube network, thereby accomplishing any desired permutation or data movement of the N data elements.

With reference now to FIG. 1, a conventional multi-stage cube network 100 is illustrated. Multi-stage cube network 100 is configured for data movement of an input data vector comprising N=8 data elements, depicted as input[7:0] 104. Each data element of input[7:0] 104 may be one or more bits wide. Multi-stage cube network 100 includes $\log_2(N)=\log_2(8)=3$ stages, identified as stage 0, stage 1, and stage 2, for moving one or more of the N data elements of input[7:0] 104. For a desired operation, once the data elements are moved in a programmable manner across the $\log_2(N)$ stages, the output data vector, depicted as output[7:0] 106 is obtained.

Each stage (i.e., states 0, 1, 2) includes N/2=8/2=4 "interchange boxes," which are configurable switches to implement data movement in one or more configurations or settings. In between stages, the data element can pass straight through or move by a power-of-2 distance, guided by the interchange boxes. For instance, in the depicted configuration, multi-stage cube network 100 is shown to pass data element[0] straight through between input[7:0] 104 and output[7:0] 106, which shows no movement or in other words, movement by a "zero distance" or a distance of "0" between each stage. However, in another example, data element[1] is shown to be provided from input[7:0] 104 to stage 0 (with a rearrangement by a distance of "1" or "2^0"); moved by a distance of "0" between stage 0 and stage 1; moved by a distance of "1" between stage 1 and stage 2; and moved by a distance of "0" between stage 2 and output[7:0] 106. Similarly, data element[3] is shown to be provided to stage 0 with a rearrangement by a distance of "4" or "2^2" from input[7:0] 104; moved by a distance of "4" between stage 0 and stage 1; moved by a distance of "0" between stage 1 and stage 2; and moved by a distance of "0" between stage 2 and output[7:0] 106. Accordingly, each data element can be moved a zero distance or a power-of-2 distance between stages (e.g., a movement of zero or a movement of a power-of-2 distance), based on how the interchange boxes are configured (as shown, some data elements can be moved by a zero distance while some other data elements can be moved by various power-of-2 distances, such as distances of 1, 4, etc.)

Interchange box 102 is particularly identified in FIG. 1 for the sake of further explanation of the functionality of the interchange boxes. The remaining interchange boxes are similarly configured and therefore will not be explained in further detail. Accordingly, focusing on interchange box 102, it will be seen that interchange box 102 may be configured in several ways. The different ways in which interchange box 102 can be configured have been identified in FIG. 1 as configuration 102a (straight), configuration 102b (exchange), configuration 102c (lower broadcast) and configuration 102d (upper broadcast). In each of these configurations, interchange box 102 is shown to accept the same two input data elements [0] and [4]. The outputs in each case will be based on the particular configuration of interchange box 102. In this explanation, input data element [0] may be referred to as the upper input data element and input data element[4] may be referred to as the lower input data element.

Referring to the "straight" configuration 102a, interchange box 102 causes a pass through of the upper input data element and the lower input data element. As seen, the upper input data element[0] and lower input data element[4] are passed through to appear as corresponding upper and lower output data elements [0] and [4], respectively, at the output of interchange box 102 set in the straight configuration 102a.

In the "exchange" configuration 102b, the upper and lower input data elements[0] and [4] are swapped to generate upper output data element[4] and lower output data element[0]. In the "lower broadcast" configuration 102c, lower input data element[4] is broadcast to appear as both the upper output data element[4] and the lower output data elements[4]. In the "upper broadcast" configuration 102d, the opposite of configuration the lower broadcast configuration 102c is implemented to broadcast upper input data element[0] to appear as both the upper output data element [0] and the lower output data elements [0].

Accordingly, by controlling the configuration of each interchange box, various data movement operations of the corresponding upper and lower input data elements for each interchange box is achieved in multi-stage cube network 100. However, multi-stage cube network 100 cannot achieve all possible data movement operations of the input[7:0] 104. In order to achieve all possible data movement operations of input[7:0] 104, a so-called Benes network may be employed. To put it simply, the Benes network is formed by taking the mirror image of multi-stage cube network 100 and tacking on the mirror image to output[7:0] 106, such that there are now $2*\log_2(N)-1=2*\log_2(8)-1=5$ stages between input[7:0] 104 and output[7:0] 106 in the resulting Benes network. To further explain, the multi-stage cube network 100 is mirrored and added to the stage following stage 2, such that the resulting Benes network would appear as a sequence of stages {0, 1, 2, 1, 0} between input[7:0] 104 and output[7:0] 106.

In conventional multi-stage cube network 100 and in Benes networks using interchange boxes as described above, each interchange box is implemented with a pair of 2×2 switches which allow for the four configurations 102a-102d, for example. A 2-bit control may be provided to each interchange box to select a configuration based on the desired data movement operation. Each interchange box may be individually controlled. In processors which implement conventional multi-stage cube networks and Benes networks, individual 2-bit controls for each interchange box may be provided through a separate instruction. Thus, for moving a data vector with N data elements, a multi-stage cube network would need N/2 2-bit control instructions for each interchange box in one stage, multiplied by $\log_2(N)-1$ for all the stages. Similarly, for a Benes network, N/2* $(2*\log_2(N)-1)$ 2-bit control instructions would be needed. As can be understood, conventional implementations utilizing separate instructions to control configurations of each interchange box of conventional multi-stage cube networks and Benes networks would incur large code sizes and low performance.

In contrast to conventional implementations, exemplary aspects described below include SIMD instructions to control exemplary multi-stage cube networks. In this manner, exemplary aspects provide improved code size, higher efficiency, and performance. In an exemplary aspect, at least two SIMD instructions are provided in instruction sets which can be executed on a processor configured to implement exemplary multi-stage cube networks.

The processor may include a first multi-stage cube network which is responsive to or controllable by a first SIMD instruction, where the first SIMD instruction may control data movement of data elements of an input vector using the first multi-stage cube network. Similarly, the processor may include second a multi-stage cube network which is responsive to or controllable by a second SIMD instruction, where the second SIMD instruction may control data movement of data elements of an input vector using the second multi-stage cube network.

In some aspects, the second multi-stage cube network may be a mirrored version of the first multi-stage cube network. For example, the first and second multi-stage cube networks can, in combination, be used to implement a full Benes network, thus making it possible to achieve all possible data movement operations for the data elements of the input vector by using the first and second SIMD instructions.

In addition to control, the first and second SIMD instructions can also provide the data elements of the input data vectors on which data movement operations can be performed using the first and second multi-stage cube networks. For example, the first multi-stage cube network may accept a first input data vector provided by the first SIMD instruction. Using corresponding control elements, also provided by the first SIMD instruction, the first multi-stage cube network may implement a corresponding data movement operation on the first input data vector to generate a first output data vector. Similarly, the second SIMD instruction can include a second data input vector and related control elements. In some cases, the first output data vector may be specified as the second input data vector by the second SIMD instruction. The second multi-stage cube network may implement data movement operations on the second input data vector (which may be the first output data vector) to generate a second output vector. Thus it is possible to use the first and second SIMD instructions to cause the data movement operations implemented by the first and second multi-stage cube networks in a back-to-back fashion in order to move data elements of the first input data vector and generate the second output data vector. In this manner, a data movement in a Benes network may be effectively accomplished using the first and second SIMD instructions. In other words, all possible data movement operations for the first input data vector may be accomplished using the first and second SIMD instructions.

In exemplary aspects, the first and second multi-stage cube networks may include switches, referred to as "movement elements" in this disclosure. The movement elements are simpler in comparison to the conventional interchange boxes. For example, a movement element may have the functionality of a 2×1 multiplexor which selects as its output, one of two inputs, e.g., a lower input or an upper input. In contrast to the previously discussed conventional interchange box 102, the exemplary movement elements require a single control bit for each movement element. For each input data element to be moved, one control bit can be provided for each stage, so that when N=8 and there are 3 stages of movement, 3 control bits are provided for movement of each data element, one control bit per data element, per stage. Once again, data movement may be by a zero distance or a power-of-2 distance between stages.

Exemplary aspects will now be described in further detail for an example case where N=8. However, it will be appreciated that this value of N is merely for the sake of illustration and not to be construed as a limitation. As such, exemplary aspects can be extended to data movement operations on any number "N" of data elements (where N is a positive integer), without departing from the scope of this disclosure.

Figure 2A:
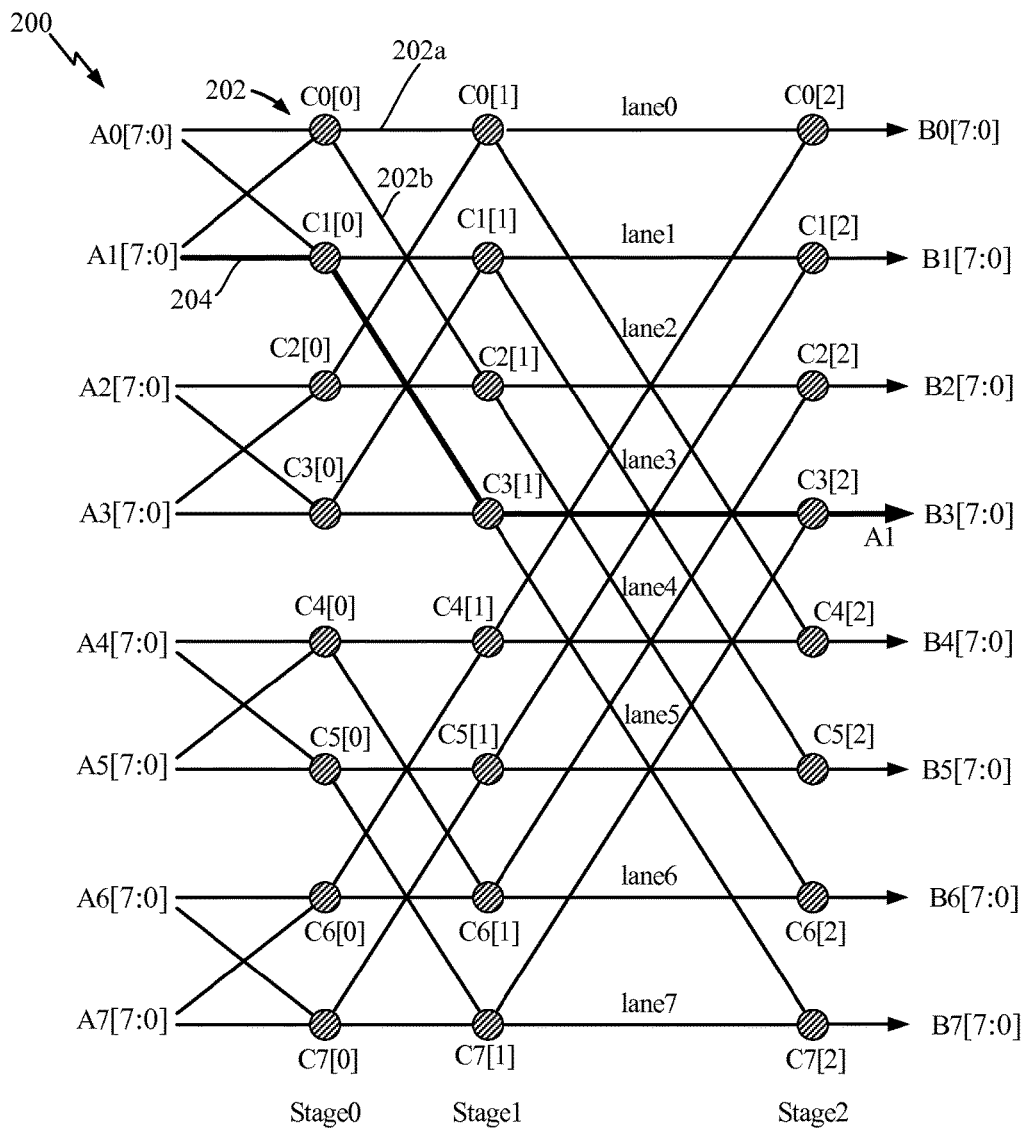
FIGS. 2A-B illustrate first and second direction multi-stage cube networks configured according to exemplary aspects with movement elements controllable by control bits of first and second SIMD instructions.

With reference now to FIG. 2A, an exemplary first SIMD instruction, SIMD_Move1 (VB, VA, VC) for data movement of a first input data vector VA is shown. Also shown is first multi-stage cube network 200. As will be explained further with reference to FIGS. 4-5, first multi-stage cube network 200 may be implemented in a processor (e.g., processor 402), which is responsive to the first SIMD instruction, SIMD_Move1 (VB, VA, VC). First multi-stage cube network 200 may be implemented in hardware, for example, within an execution unit of an instruction pipeline or execution pipeline of the processor. The combinational logic for implementing first multi-stage cube network 200 will be described below, along with the operation of first multi-stage cube network 200 when the first SIMD instruction, SIMD_Move1 (VB, VA, VC) is executed.

In more detail, the first SIMD instruction, SIMD_Move1 (VB, VA, VC) includes three operands, VA, which is an input data vector; VB, which is an output data vector obtained when SIMD_Move1 is executed, and VC, which is a control vector. Input data vector VA comprises eight input data elements: {A7[7:0], A6[7:0], A5[7:0], A4[7:0], A3[7:0], A2[7:0], A1[7:0], A0[7:0]}. The input data elements are an ordered set which fall under corresponding lanes {lane7, lane6, lane5, lane4, lane3, lane2, lane1, lane0} (or simply, "{lanes7-0}," for the sake of convenience), which may also be referred to as SIMD lanes. Data movement operations discussed herein can cause the input data elements to move from one SIMD lane to one or more SIMD lanes (keeping in mind that a data element can be broadcast to multiple lanes and a pass-through, where a particular data element may retain its prior position or lane, is also considered as a data movement, but of a zero distance).

Each of the eight input data elements {A7[7:0], A6[7:0], A5[7:0], A4[7:0], A3[7:0], A2[7:0], A1[7:0], A0[7:0]} is shown to be 8-bits or 1-byte wide in the illustrated example, but it will be understood that they can generally be one or more bits wide in other examples. In the example scenario where each input data element is 8-bits or 1-byte wide, a processor implementing the first SIMD instruction is configured to support 64-bit wide operands such as input data vector VA comprising eight 8-bit wide data elements, such that input data vector VA comprises 64-bits. As previously mentioned, the first SIMD instruction may specify input data vector VA as a first operand and control vector VC as a second operand. Control vector VC comprises eight control elements {C7[7:0], C6[7:0], C5[7:0], C4[7:0], C3[7:0], C2[7:0], C1[7:0], C0[7:0]} corresponding to {lane7, lane6, lane5, lane4, lane3, lane2, lane1, lane0} respectively. Thus, in the illustrated example where each of the control elements are 8-bits (or 1-byte) wide, control vector VC is 64-bits wide. The first SIMD instruction may also specify output data vector VB as a third operand, where output data vector VB comprises eight output data elements {B7[7:0], B6[7:0], B5[7:0], B4[7:0], B3[7:0], B2[7:0], B1[7:0], B0[7:0]}, which are generated based on movement of the data elements of the input data vector VA across the SIMD lanes. As seen, output data vector VB is also 64-bits wide in this example.

FIG. 2A shows first multi-stage cube network 200 with a number of n=log$_2$(8)=3 stages and N=8 lanes. As previously, data elements of input data vector VA may move by a zero distance or a power-of-2 distance between stages. There are N=8 movement elements (e.g., movement element 202) per stage and per lane, and a corresponding number n of control bits to implement the data movement. Thus, there are n×N=3×8=24 movement elements which are controlled by corresponding n=3 control bits per each of the N=8 lanes in first multi-stage cube network 200 for implementing SIMD_Move1 (VB, VA, VC). Movement element 202, for example, is in lane0, stage 0, and is controlled by bit[0] of control element C0[7:0], or "C0[0]," as shown. Each movement element is configured to select between two inputs, generally denoted as an upper input element and a lower input element in this discussion. For example, for movement element 202, the upper input element is A0[7:0] and the lower input element is A1[7:0]. In an example implementation, if C0[0]=0 then movement element 202 selects A0[7:0] as its output, whereas if C0[0]=1, movement element 202 selects A1[7:0] as its output. Although movement element 202 may be implemented using 8-bit wide 2×1 multiplexors for the above functionality, it must be noted that the output of movement element 202 may be replicated on output lines 202a and 202b. This allows for data movement operations such as broadcasting (i.e., for input A0[7:0] to appear on two or more output lanes of first multi-stage cube network 200).

Accordingly, control bit C0[0] can be used to control data movement element 202 in lane 0, stage 0. Similarly, control bits C0[1] and C0[2] can be used to control data movement in lane0, stage 1 and lane0, stage 2, respectively. The remaining control bits of control elements C7[7:0], C6[7:0], C5[7:0], C4[7:0], C3[7:0], C2[7:0], C1[7:0], similarly control movement elements in lanes7-1 across stages 1, 2, and 3 correspondingly. Once data elements of input data vector VA are caused to traverse through the three stages in this example, by the control of corresponding bits of the control elements of control vector VC, first multi-stage cube network 200 generates the desired output data vector VB.

In order to illustrate an example data movement operation, movement path 204 is highlighted in FIG. 2A, showing movement of input data element A1[7:0] from input lane1 to output lane3 to form output data element B3. Data element A1[7:0] may be moved by a zero distance or a power-of-2 distance between stages to achieve the intended movement path 204. Movement path 204 can be implemented by setting the following control bits as C1[0]=1; C3[1]=0; and C3[2]=0, which control corresponding movement elements to select an upper input element if the control bit is "0" and a lower input element if the control bit is "1." Thus, following the previous notation, data element A1[7:0] is provided as an input to stage 0. The arrangement of data elements provided to stage 0 as inputs can be varied to suit various movement operations between the stages. For example, while A1[7:0] is shown to be provided as an input to stage 0 with a zero movement in movement path 204, A1[7:0] may be provided as an input to stage 0 of a different movement path, with a different distance (e.g., with a distance of 1 to movement element 202, in a different movement path, not explicitly identified, in FIG. 2A). Continuing with movement path 204, A1[7:0] may be moved by a distance of "2" between stage 0 and stage 1; and a distance of "0" between stage 2 to generate the output data element B3. In similar manner, numerous other data movement operations can be implemented using SIMD_Move1 (VB, VA, VC). Thus, with a single SIMD instruction, SIMD_Move1 (VB, VA, VC) first multi-stage cube network 200 can be implemented to provide movement of input data vector VA to generate output data vector VB, with control for each movement element in each lane, per stage provided by control vector VC.

Based on the specific data movement operation desired (e.g., movement path 204 for data element A1), a compiler or programmer may set the corresponding control bits VC in SIMD_Move1 (VB, VA, VC). It will be understood that first multi-stage cube network 200 need not be fully utilized for every operation. For example, if some instructions defined by SIMD_Move1 (VB, VA, VC) require movement to be effected on only a subset of the input data elements, then default control bits may be provided for the data movement elements that are not utilized for a particular operation. This may apply to scenarios where first multi-stage cube network 200 is utilized for data movement operations on a smaller size operand or input data vector with less data elements (e.g., a 32-bit input data vector VA' with only four 8-bit data elements {A3[7:0], A2[7:0], A1[7:0], and A0[7:0]}).

While SIMD_Move1 covers a subset of all possible data movement operations, a second SIMD instruction, SIMD_Move2 is provided to implement the remaining subset of data movement operations. SIMD_Move1 and SIMD_Move2, may, in combination, achieve all possible data movement operations for a particular input vector. For example, SIMD_Move1 and SIMD_Move2, may, in combination, be used to implement a Benes network. In one aspect, the output data vector VB of SIMD_Move1 discussed above may be provided as an input data vector for SIMD_Move2, such that all possible movement operations of input data vector VA of SIMD_Move1 can be provided at an output data vector of SIMD_Move2. However, it will be understood that SIMD_Move2 need not be implemented only combination with SIMD_Move1, and as such, both SIMD_Move1 and SIMD_Move2 may be individually and independently employed in any code or set of instructions executable by a processor.

Figure 2B:
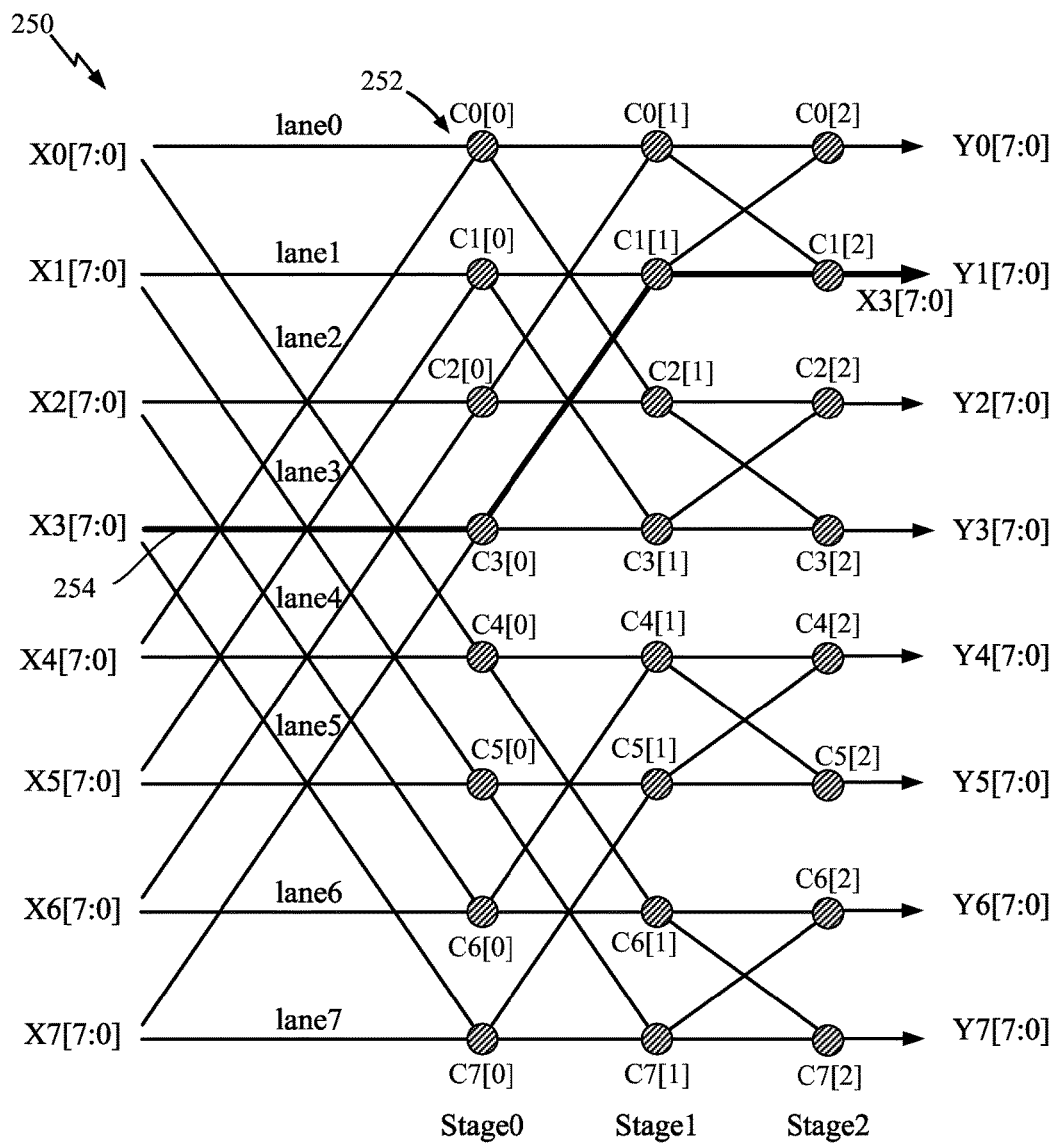

With reference to FIG. 2B, second multi-stage cube network 250 is shown for implementing SIMD_Move2 (VY, VX, VC). Like first multi-stage cube network 200 of FIG. 2A, second multi-stage cube network 250 may also be implemented by hardware, for example, in an execution unit of a processor (e.g., processor 402 discussed with regard to FIGS. 4-5 below). Implementation of SIMD_Move2 (VY, VX, VC) for data movement of a second input data vector VX in second multi-stage cube network 250 can generate second output data vector VY under control of control vector VC of SIMD_Move2 (VY, VX, VC).

Similar to the first SIMD instruction SIMD_Move1, the second SIMD instruction SIMD_Move2 (VY, VX, VC) includes three operands. The first operand, input data vector VX comprises eight input data elements: {X7[7:0], X6[7:0], X5[7:0], X4[7:0], X3[7:0], X2[7:0], X1[7:0], X0[7:0]}. The input data elements are an ordered set which fall under corresponding {lanes7-0}. Each of the eight input data elements {X7[7:0], X6[7:0], X5[7:0], X4[7:0], X3[7:0], X2[7:0], X1[7:0], X0[7:0]} are shown to be 8-bits or 1-byte wide, where a processor implementing the second SIMD instruction supports 64-bit wide operands, keeping in mind that alternative aspects can be implemented with different number of one or more bits in each data element. The second operand of the second SIMD instruction SIMD_Move2 (VY, VX, VC) may be control vector VC, which includes eight control elements {C7[7:0], C6[7:0], C5[7:0], C4[7:0], C3[7:0], C2[7:0], C1[7:0], C0[7:0]} corresponding to {lane7, lane6, lane5, lane4, lane3, lane2, lane1, lane0} respectively. Control vector VC may also be 64-bits wide with each of the control elements being 8-bits or 1-byte wide. The second SIMD instruction may also specify output data vector VY as a third operand, where output data vector VY comprises eight output data elements {Y7[7:0], Y6[7:0], Y5[7:0], Y4[7:0], Y3[7:0], Y2[7:0], Y1[7:0], Y0[7:0]}, which are generated based on movement of the data elements of the input data vector VX across the SIMD lanes. In some aspects, output data vector VB of the first SIMD instruction, SIMD_Move1 (VB, VA, VC) may be provided as input data vector VX of the second SIMD instruction, SIMD_Move2 (VY, VX, VC). In this manner, all possible data movement operations for input data vector VA can be achieved by executing the first SIMD instruction in first multi-stage cube network 200 and the second SIMD instruction in second multi-stage network 250, to generate output data vector VY.

As will be appreciated, second multi-stage cube network 250 is similar to first multi-stage cube network 200 in many aspects, with a significant difference being the topology of these two networks. Second multi-stage cube network 250 is a mirrored version of first multi-stage cube network 200 from the perspective of the network connections between the inputs and outputs of these two networks. Given the substantial similarities between the two networks, an exhaustive description of second multi-stage cube network 250 will be avoided for the sake of brevity.

Briefly, movement element 252 is depicted in second multi-stage cube network 250 which is controlled by control bit C0[0] and configured to select between X0[7:0] and X4[7:0] (as opposed to movement element 202, discussed with regard to first multi-stage cube network 200, configured to select between A0[7:0] and A1[7:0]). An exemplary movement path 254 is also highlighted in FIG. 2B, for movement of data element X3[7:0] from input lane3 to form output data element Y1[7:0] in output lane1 in second multi-stage cube network 250. Similar to movement path 204 discussed previously, movement path 254 may cause input data element X3[7:0] to move by a zero distance or a power-of-2 distance between stages. As shown, input data element X3[7:0] is provided as an input to stage 0. As previously, the arrangement of data elements provided to stage 0 as inputs can be varied to suit various movement operations between the stages. For example, while X3[7:0] is shown to be provided as an input to stage 0 with a zero movement in movement path 254, a different input element X4[7:0] may be provided as an input to stage 0 of a different movement path, with a different distance (e.g., with a distance of 4 to movement element 252 in a different movement path, not explicitly identified, in FIG. 2A). Returning to movement path 254 for X3[7:0], X3[7:0] may be moved by a distance of "2" between stage 1 and stage 2; and moved by a distance of "0" from stage 2 to form output data element Y1. This movement of input data element X3[7:0] from lane3 of input data vector VX to output lane1 of output data vector VY can be implemented by setting the control bits C3[0]=0; C1[1]=1; and C1[2]=1.

Thus, a different topology of movement elements is implemented by second multi-stage cube network 250, which complements first multi-stage cube network 200 to provide, in combination, the capability for all possible data movement operations of input data vector VA. Once again, a compiler or programmer, for example, may be able to select SIMD_Move1 to be implemented on first multi-stage cube network 200, SIMD_Move2 to be implemented on second multi-stage cube network 250, or a combination thereof, and set associated control bits for any desired data movement operation.

Figure 3:
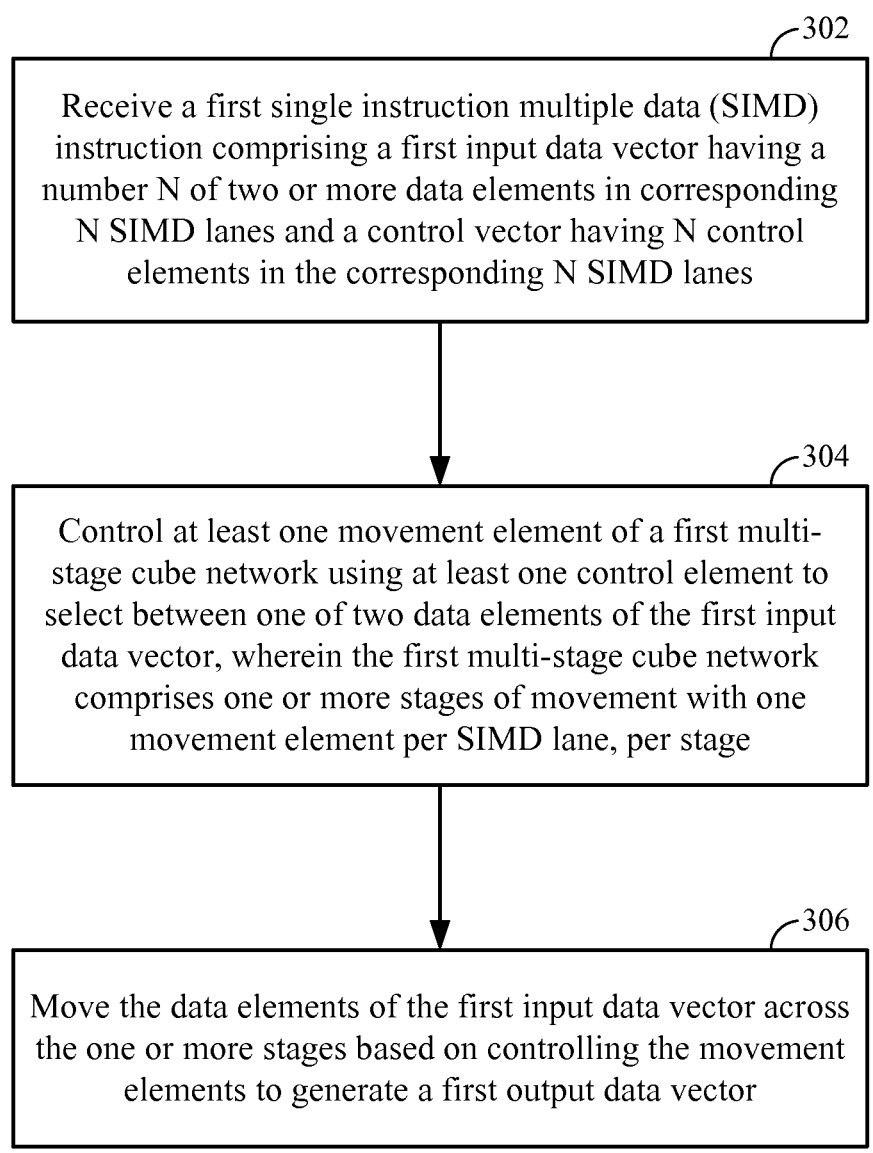
FIG. 3 illustrates a method of performing data movement operations using SIMD instructions for implementing multi-stage cube networks.

Accordingly, it will be appreciated that aspects include various methods for performing the processes, functions and/or algorithms disclosed herein. For example, as illustrated in FIG. 3, an aspect can include method 300 of performing a data movement operation which will be explained in detail below.

In Block 302, method 300 involves receiving a first single instruction multiple data (SIMD) instruction comprising an input data vector having a number N of two or more data elements in corresponding N SIMD lanes and a control vector having N control elements in the corresponding N SIMD lanes. For example, a first SIMD instruction, SIMD_Move1 (VB, VA, VC) may be received by a processor comprising hardware or logic for implementing first multi-stage cube network 200 of FIG. 2A. SIMD_Move1 (VB, VA, VC) includes input data vector VA comprising N=8 data elements {A7[7:0], A6[7:0], A5[7:0], A4[7:0], A3[7:0], A2[7:0], A1[7:0], A0[7:0]} in corresponding 8 SIMD lanes, {lanes7-0}. SIMD_Move1 (VB, VA, VC) also includes control vector VC comprising 8 control elements {C7[7:0], C6[7:0], C5[7:0], C4[7:0], C3[7:0], C2[7:0], C1[7:0], C0[7:0]} in the corresponding 8 SIMD lanes, {lanes7-0}. Each of the control elements {C7[7:0], C6[7:0], C5[7:0], C4[7:0], C3[7:0], C2[7:0], C1[7:0], C0[7:0]} comprises at least n-bits where n=$\log_2$(N) (i.e., 3-bits), each of the n-bits for controlling a corresponding movement element in each of n=$\log_2$(N) stages. Similarly, a second SIMD instruction SIMD_Move2 (VY, VX, VC) may be received by the processor in addition to or instead of the first SIMD instruction, SIMD_Move1 (VB, VA, VC).

In Block 304, method 300 includes controlling at least one movement element of a first multi-stage cube network using at least one control element to select between one of two data elements of the first input data vector, wherein the first multi-stage cube network comprises one or more stages of movement, with one movement element per SIMD lane, per stage. In some aspects, there are n such stages, where n=$\log_2$(N) (in this case, there are three stages, since N=8). For example, first multi-stage cube network 200 of FIG. 2A is controlled by SIMD_Move1 (VB, VA, VC), and more specifically, movement element 202, for example, is controlled using at least one control element C0[0] to select between one of two data elements A0[7:0] and A1[7:0] of the first input data vector VA. First multi-stage cube network 200 comprises three stages as noted above: 0, 1, 2, with one movement element per SIMD lane, per stage (a total of 3×8=24 movement elements). Similarly, if the second SIMD instruction, SIMD_Move2 (VY, VX, VC), is received, then movement elements of second multi-stage cube network 250 may similarly controlled.

In Block 306, the data elements of the first input data vector are moved across the one or more stages based on controlling the movement elements, to generate a first output data vector. In some aspects, the data elements of the first input data vector are moved by a zero distance or a power-of-2 distance between two adjacent stages. For example, movement path 204 may be implemented when the control elements of SIMD_Move1 (VB, VA, VC) have the values C1[0]=1; C3[1]=0; and C3[2]=0. The data element A1[7:0] is provided as an input to stage 0, the output of which is moved by a distance of "2" between stage 0 and stage 1, and the output of which is moved a distance of "0" between stage 2, to generate the output data element B3. In aspects where the second SIMD instruction is used in conjunction with the first SIMD instruction to implement a Benes network, for example, the first output data vector (e.g., VB) of first multi-stage cube network 200 is provided as a second input data vector (e.g., VX) of second multi-stage cube network 250. In this way, all possible data movement operations of the first input data vector VA can be implemented.

Figure 4:
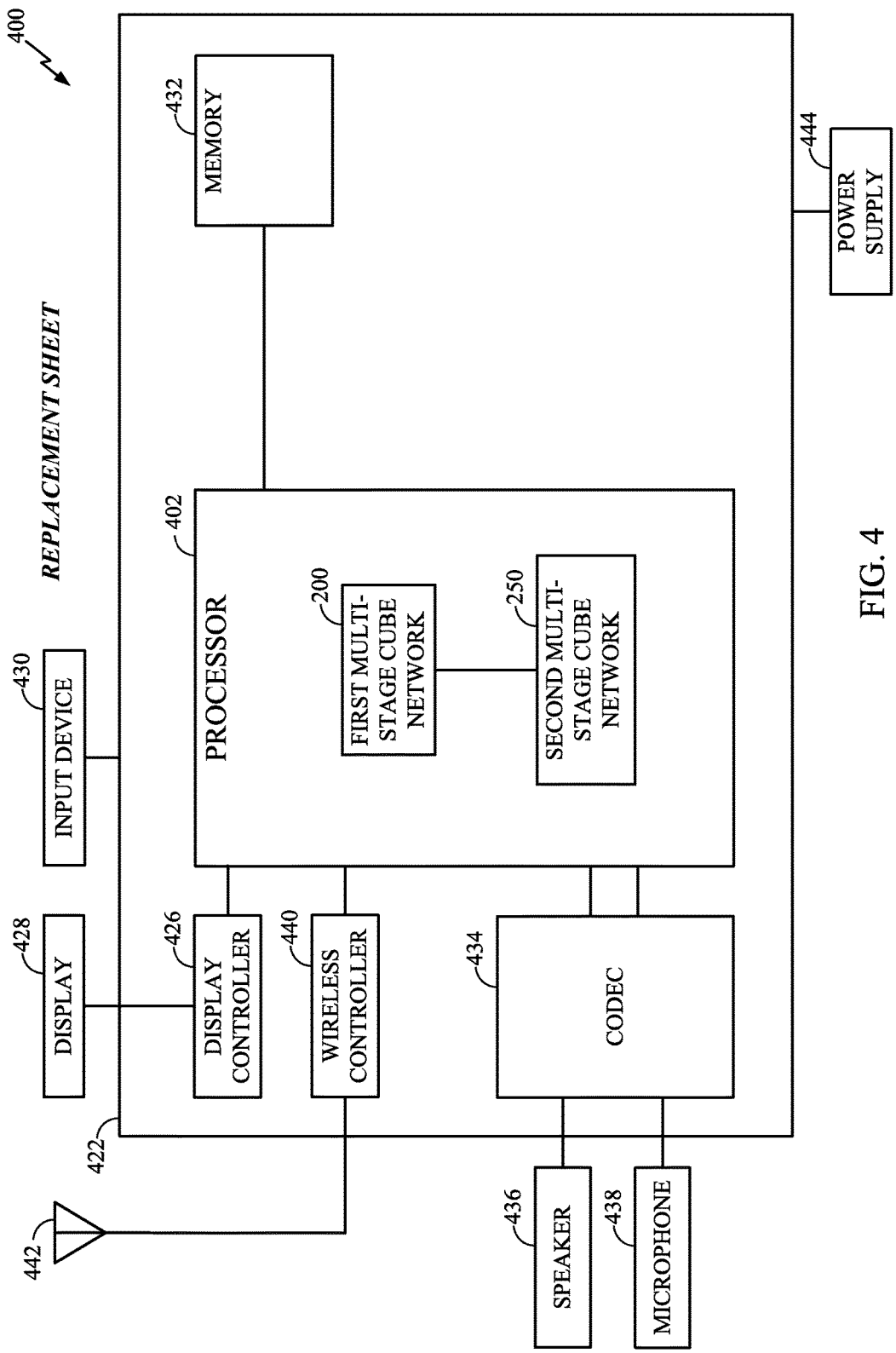
FIG. 4 illustrates an exemplary wireless device 400 in which an aspect of the disclosure may be advantageously employed.
Figure 5:
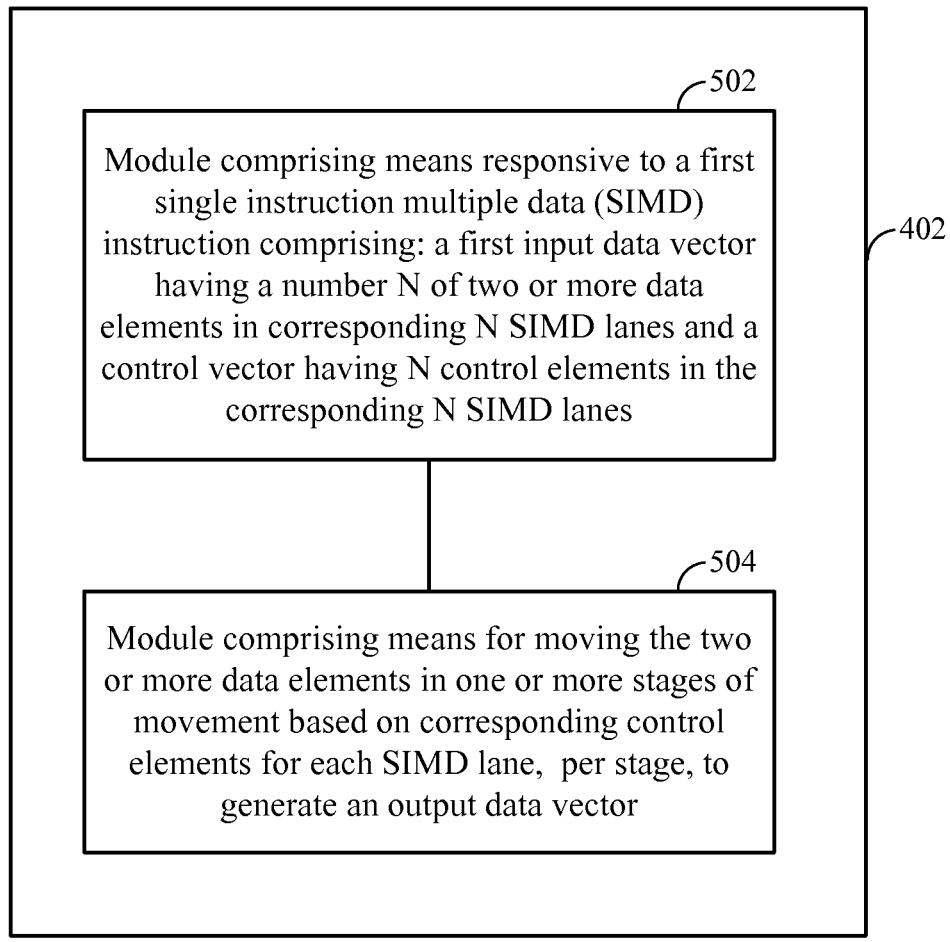
FIG. 5 is a simplified block diagram of sample aspects of an apparatus configured to support certain techniques as taught herein, in accordance with certain example implementations.

Referring to FIG. 4, a block diagram of a particular illustrative aspect of wireless device 400 according to exemplary aspects. Wireless device 400 includes processor 402 which may be configured to execute the first and second SIMD instructions for data movement, for example, by implementing first and second multi-stage cube networks 200 and 250 and performing the method 300. In FIG. 4, first and second multi-stage cube networks 200 and 250 are shown to be connected or coupled, to illustrate that the output of first multi-stage cube network 200, for example, may be fed as an input to second multi-stage cube network 250, to implement a Benes network. An exemplary implementation of processor 402 is also shown in FIG. 5. With continuing reference to FIG. 4, processor 402 may be in communication with memory 432, wherein the first and second SIMD instructions (SIMD_Move1 and SIMD_Move2) may be stored and readable from memory 432. FIG. 4 also shows display controller 426 that is coupled to main processor 102 and to display 428. Coder/decoder (CODEC) 434 (e.g., an audio and/or voice CODEC) can be coupled to processor 402. Other components, such as wireless controller 440 (which may include a modem) are also illustrated. Speaker 436 and microphone 438 can be coupled to CODEC 434. FIG. 4 also indicates that wireless controller 440 can be coupled to wireless antenna 442. In a particular aspect, processor 402, display controller 426, memory 432, CODEC 434, and wireless controller 440 are included in a system-in-package or system-on-chip device 422.

In a particular aspect, input device 430 and power supply 444 are coupled to the system-on-chip device 422. Moreover, in a particular aspect, as illustrated in FIG. 4, display 428, input device 430, speaker 436, microphone 438, wireless antenna 442, and power supply 444 are external to the system-on-chip device 422. However, each of display 428, input device 430, speaker 436, microphone 438, wireless antenna 442, and power supply 444 can be coupled to a component of the system-on-chip device 422, such as an interface or a controller.

It should be noted that although FIG. 4 depicts a wireless communications device, main processor 102, coprocessor 104, and memory 432 may also be integrated into a set top box, a music player, a video player, an entertainment unit, a navigation device, a communications device, a personal digital assistant (PDA), a fixed location data unit, or a computer. Further, at least one or more exemplary aspects of wireless device 400 may be integrated in at least one semiconductor die.

With reference to FIG. 5, an example implementation of processor 402 is shown. Processor 402 is represented by interrelated functional modules which may be connected as shown. Module 502 may correspond, at least in some aspects to, module, logic or suitable first means for moving data elements, the first means responsive to a first single instruction multiple data (SIMD) instruction, the first SIMD instruction comprising a first input data vector having a number N of two or more data elements corresponding to N SIMD lanes and a control vector having N control elements corresponding to the N SIMD lanes. For example, module 502 may include processor 402 configured to receive instructions and data from an instruction cache (not shown) or memory 432. Module 502 may comprise components of processor 402, such as execution units comprising the first and second multi-stage cube networks 200 and 250.

Module 504 may include a module, logic, or suitable means for moving the two or more data elements in one or more stages of movement based on corresponding control elements for each SIMD lane, per stage, to generate an output data vector. For example, module 504 may include the first multi-stage cube network 200 to implement data movement of the input data vector, in one or more stages of movement, based on the corresponding control elements. As previously described, the first multi-stage cube network 200 may include movement elements controllable by the control elements. For example, there may be one movement element per stage, per SIMD lane, where a movement element may select between one of two data elements of the first input data vector based on a corresponding control element. Accordingly, the movement elements may move the data elements by a zero distance or a power-of-2 distance between two adjacent stages, in order to generate an output data vector based on the first SIMD instruction after all the stages of movement have been traversed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include computer readable media embodying a method for performing data movement operations in a multi-stage cube network based on a SIMD instruction. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of performing a data movement operation, the method comprising:
    receiving a first single instruction multiple data (SIMD) instruction comprising a first input data vector having a number N of two or more data elements in corresponding N SIMD lanes and a control vector having N control elements in the corresponding N SIMD lanes;
    controlling at least one movement element of two or more movement elements of a first multi-stage cube network using at least one control element of the control vector, wherein the controlling comprises selecting between one of two data elements of the first input data vector based only on bits of the at least one control element and passing the selected data element to one or more successive stages depending on a configuration of the movement element wherein the configuration of the movement element may pass the selected data element to one successive stage and may replicate the selected data element and pass the replicated element to at least two successive stages, wherein the first multi-stage cube network comprises two or more stages of movement with the two or more movement elements comprising one movement element per SIMD lane, per stage; and
    moving the two or more data elements of the first input data vector across the two or more stages based on the controlling the two or more movement elements to generate a first output data vector.

2. The method of claim 1, comprising implementing the first multi-stage cube network with a number n of stages, where $n=\log_2(N)$.

3. The method of claim 2, wherein the at least one control element comprises at least n-bits, each of the n-bits for controlling a corresponding movement element in each stage.

4. The method of claim 2, wherein the first multi-stage cube network comprises n×N movement elements.

5. The method of claim 1, comprising moving the two or more data elements of the first input data vector by a zero distance or a power-of-2 distance between two adjacent stages.

6. The method of claim 1 comprising receiving a second SIMD instruction to control movement elements of a second multi-stage cube network, wherein a combination of the first and second multi-stage cube networks allows all possible data movement operations of the N data elements across the N SIMD lanes.

7. The method of claim 6, comprising providing the first output data vector as a second input data vector of the second multi-stage cube network.

8. The method of claim 1, wherein the first input data vector is 64-bits wide, having eight data elements, where each data element is 8-bits wide; and wherein the control vector comprises eight control elements, where each control element is at least 3-bits wide.

9. A processor comprising:
a first multi-stage cube network responsive to a first single instruction multiple data (SIMD) instruction, the first SIMD instruction comprising a first input data vector having a number N of two or more data elements corresponding to N SIMD lanes and a control vector having N control elements corresponding to the N SIMD lanes;
wherein the first multi-stage cube network is configured to perform data movement of the two or more data elements in two or more stages of movement,
the first multi-stage cube network comprising two or more movement elements with one movement element per SIMD lane, per stage,
wherein at least one of the two or more movement elements is configured to:
select between one of two data elements of the two or more data elements of the first input data vector based only on bits of a control element of the control vector and pass the selected data element to one or more successive stages depending on a configuration of at least one movement element wherein the configuration of the movement element may pass the selected data element to one successive stage and may replicate the selected data element and pass the replicated element to at least two successive stages; and
move the two or more data elements of the first input data vector across the two or more stages based on the N control elements of the control vector, to generate a first output data vector.

10. The processor of claim 9, wherein the first multi-stage cube network comprises a number n of stages, where $n=\log_2(N)$.

11. The processor of claim 10, wherein at least one control element comprises at least n-bits.

12. The processor of claim 10 comprising n×N movement elements.

13. The processor of claim 9, wherein the two or more movement elements are configured to move the two or more data elements by a zero distance or a power-of-2 distance between two adjacent stages.

14. The processor of claim 9, further comprising a second multi-stage cube network responsive to a second SIMD instruction to move a second input data vector, wherein the second multi-stage cube network is a mirror image of the first multi-stage cube network and an output of the first multi-stage cube network is an input of the second multi-stage cube network.

15. The processor of claim 9, wherein the first input data vector is 64-bits wide, having eight data elements, where each data element is 8-bits wide; and wherein the control vector comprises eight control elements, where each control element is at least 3-bits wide.

16. The processor of claim 9 integrated into a device selected from the group consisting of a set top box, music player, video player, entertainment unit, navigation device, communications device, personal digital assistant (PDA), fixed location data unit, and a computer.

17. A processor comprising:
means for receiving a first single instruction multiple data (SIMD) instruction, the first SIMD instruction comprising a first input data vector having a number N of two or more data elements corresponding to N SIMD lanes and a control vector having N control elements corresponding to the N SIMD lanes
a first means for moving data elements, the first means responsive to the first single instruction multiple data (SIMD) instruction;
wherein the first means comprises means for moving the two or more data elements in two or more stages of movement based on selecting between one of two data elements based only on bits of corresponding control elements of the control vector for each SIMD lane, per stage and means for passing the selected data element to one or more successive stages depending on a configuration of the movement element wherein the configuration of the movement element may pass the selected data element to one successive stage and may replicate the selected data element and pass the replicated element to at least two successive stages, to generate an output data vector.

18. The processor of claim 17, wherein the first means comprises a number n of stages, where $n=\log_2(N)$.

19. A non-transitory computer-readable storage medium comprising instructions executable by a processor, which when executed by the processor cause the processor to perform data movement operations, the non-transitory computer-readable storage medium comprising:
a first single instruction multiple data (SIMD) instruction comprising a first input data vector having a number N of two or more data elements in corresponding N SIMD lanes and a control vector having N control elements in the corresponding N SIMD lanes,
wherein a first multi-stage cube network comprising two or more stages of movement and one movement element per SIMD lane per stage to generate a first output data vector is responsive to the first SIMD instruction, wherein a movement element is controllable to select between one of two data elements based only on bits of a corresponding control element of the control vector and wherein the selected data element is controlled to pass the selected data element to one or more successive stages depending on a configuration of the movement element wherein the configuration of the movement element may pass the selected data element to one successive stage and may replicate the selected data element and pass the replicated element to at least two successive stages.

20. The non-transitory computer-readable storage medium of claim 19, wherein the first multi-stage cube network comprises a number n of stages, where $n=\log_2(N)$.

21. The non-transitory computer-readable storage medium of claim 20, wherein at least one control element of the first SIMD instruction comprises at least n-bits, each of the n-bits for controlling a corresponding movement element in each stage.

22. The non-transitory computer-readable storage medium of claim 21, wherein the first multi-stage cube network comprises n×N movement elements.

23. The non-transitory computer-readable storage medium of claim 19, wherein the first SIMD instruction comprises code for moving the two or more data elements of the first input data vector by a zero distance or a power-of-2 distance between two adjacent stages.

24. The non-transitory computer-readable storage medium of claim 19 comprising: a second SIMD instruction, wherein a second multi-stage cube network is responsive to the second SIMD instruction, wherein a combination of the first and second multi-stage cube networks allows all possible data movement operations of the N data elements across the N SIMD lanes.

25. The non-transitory computer-readable storage medium of claim 24, comprising code for providing the first output data vector as a second input data vector of the second multi-stage cube network.

26. The non-transitory computer-readable storage medium of claim 19, wherein the first input data vector is 64-bits wide, having eight data elements, where each data element is 8-bits wide; and wherein the control vector comprises eight control elements, where each control element is at least 3-bits wide.

\* \* \* \* \*